C. W. McDONALD.
MACHINE FOR CRACKING NUTS.
APPLICATION FILED JAN. 6, 1912.
1,043,712.
Patented Nov. 5, 1912.
2 SHEETS—SHEET 1.
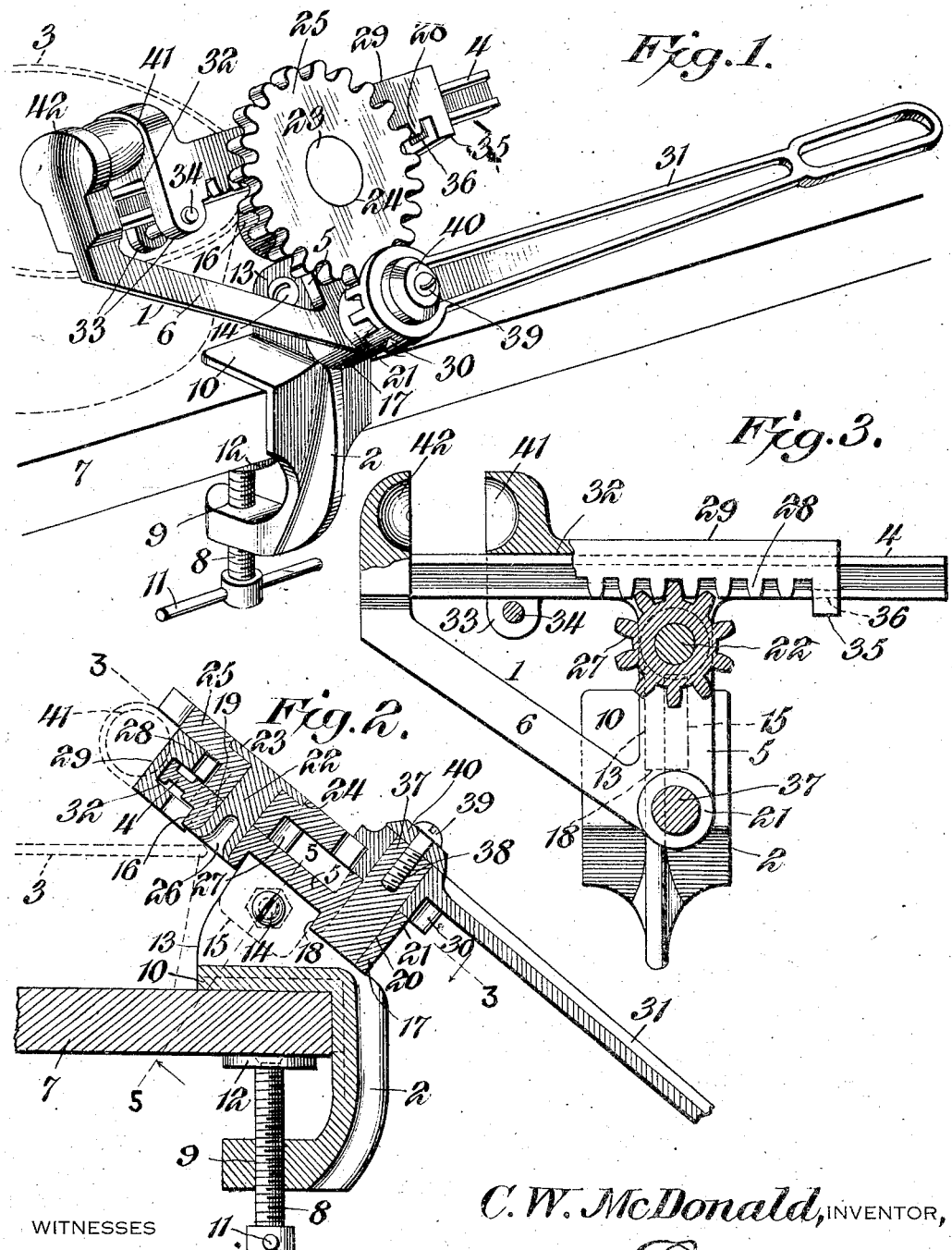
C. W. McDonald, INVENTOR,
WITNESSES C. W. McDONALD.
MACHINE FOR CRACKING NUTS.
APPLICATION FILED JAN. 6, 1912.
1,043,712.
Patented Nov. 5, 1912.
2 SHEETS—SHEET 2.
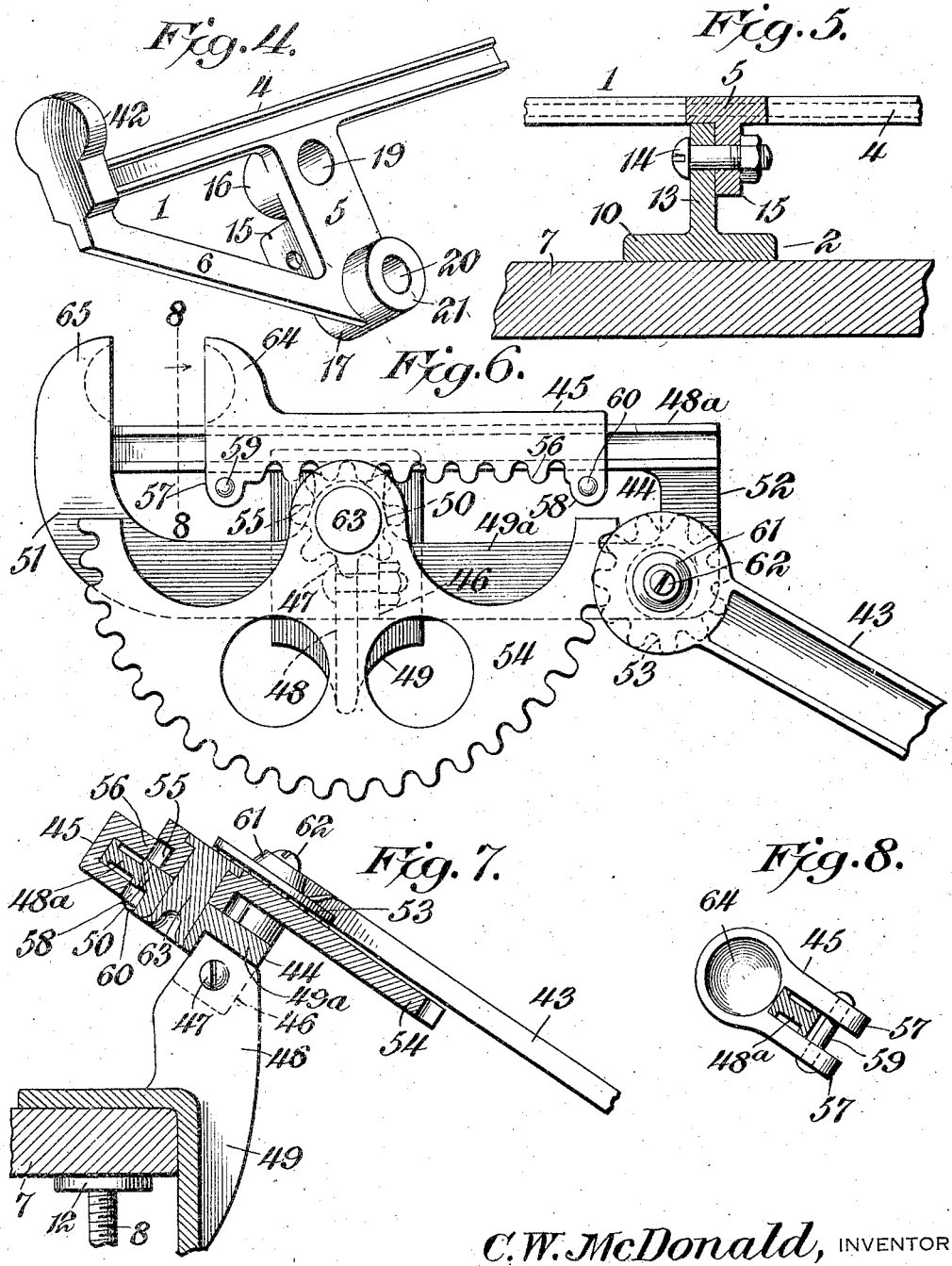
C. W. McDonald, INVENTOR,
WITNESSES
BY
ATTORNEY

UNITED STATES PATENT OFFICE.

CHARLES WALTON McDONALD, OF AUSTIN, TEXAS.

MACHINE FOR CRACKING NUTS.

1,043,712.  Specification of Letters Patent. Patented Nov. 5, 1912.

Application filed January 6, 1912. Serial No. 669,803.

*To all whom it may concern:*

Be it known that I, CHARLES WALTON MCDONALD, a citizen of the United States, residing at Austin, in the county of Travis and State of Texas, have invented a new and useful Machine for Cracking Nuts, of which the following is a specification.

The invention relates to improvements in machines for cracking nuts.

The object of the present invention is to improve the construction of nut cracking machines, and to provide a simple, inexpensive and efficient nut cracking machine of great strength and durability, designed particularly for cracking pecans, and capable of enabling the latter, from the smallest to the largest, to be rapidly and properly cracked, so that the meat can be taken out whole in perfect condition.

A further object of the invention is to provide a nut cracking machine of this character, adapted also for cracking various other nuts including Brazil nuts, black walnuts and shell bark hickory nuts and constructed so as to permit a receptacle to be arranged beneath the nut cracking means in position to receive the cracked nuts, and also capable, with a single stroke, of releasing a cracked nut to cause the same to drop into the receptacle, and of arranging the nut cracking means in position to receive another nut, thereby enabling the operator to pick up a handful of nuts with one hand and feed them rapidly one at a time to the machine, while continuously operating the latter with the other hand.

The invention also has for its object to provide lever actuated gearing adapted to operate the nut cracking means, and capable of adjustment to enable the machine to operate on any sized nut within its capacity, and also to arrange the operating handle or lever in proper position to secure the desired stroke without the handle or lever swinging across the nut engaging means and interfering with the rapid feeding of the nuts to the machine.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, without in the scope of the claims, may be resorted to without departing from the spirit or sacrificing any of the advantages of the invention.

In the drawings:—Figure 1 is a perspective view of a nut cracker, constructed in accordance with this invention. Fig. 2 is a central vertical sectional view. Fig. 3 is a sectional view on the line 3—3 of Fig. 2. Fig. 4 is a detail perspective view of the supporting frame. Fig. 5 is a sectional view on the line 5—5 of Fig. 2. Fig. 6 is a plan view, illustrating another form of the invention. Fig. 7 is a central vertical sectional view of the same. Fig. 8 is a detail sectional view on the line 8—8 of Fig. 6.

Like numerals of reference designate corresponding parts in all the figures of the drawings.

In the accompanying drawings in which is illustrated the preferred embodiment of the invention, 1 designates an approximately triangular supporting frame, mounted upon a clamp 2 and set at an inclination and extending upwardly and rearwardly from the clamp to enable a receptacle 3 for the cracked nuts to be placed beneath the upper projecting portion of the frame. The approximately triangular frame comprises a top guide bar 4, a supporting bar 5 and a brace 6. The supporting bar 5, which is inclined, is connected at its upper end to the guide bar 4 at the center thereof, and the brace 6 extends from the lower end of the inclined supporting bar to one end of the guide bar 4. The frame is preferably in the form of a casting, but it may be constructed in any other desired manner, and while the top guide bar is shown approximately I-shaped in cross section with longitudinal grooves at the side faces, it may be of any other desired form.

The clamp 2, which is adapted to engage the edge of a table top 7, or other suitable support, consists of an upright approximately C-shaped body portion and a screw 8, mounted in a threaded opening 9 of the lower end of the body portion and coöperating with the upper end 10 of the body portion to clamp the table top. The upper end of the C-shaped body forms a jaw for engaging the upper face of the table top, and the screw, which is provided at its lower end with a suitable operating handle or pin 11, has at its upper end a head 12 for engaging the lower face of the table top, but the nut cracking machine may be equipped with any other form of clamp. The clamp is provided at the top with a vertical flange 13, arranged transversely of the machine and pierced by a bolt 14, which also passes through a correspondingly arranged flange 15, depending from the lower face of the supporting bar 5. The flanges 13 and 15 are fitted flat against each other, and the upper edge of the flange 13 is straight and inclined and fits against the lower face of the bar 5 between spaced annular bosses 16 and 17, whereby the approximately triangular frame is rigidly secured to the clamp in an inclined position by a single bolt. The flange 13 is recessed at 18 adjacent to the boss 17 to receive the latter, as clearly illustrated in Fig. 2 of the drawings.

The bosses 16 and 17 surround upper and lower openings 19 and 20, and the frame is also provided at its upper face with an annular boss 21, which surrounds the lower opening at the top thereof. The upper opening 19 receives a pivot 22, shown in the form of a rivet having at its upper end a flat head 23, which is counter-sunk or seated in a recess 24 in the upper or outer face of a double gear 25. The lower portion 26 of the stem of the rivet 22 is hollow and flared outwardly, as shown, to secure the rivet in the upper opening of the frame, but any other form of pivot may be employed in mounting the double gear for rotary movement on the supporting frame. The double gear consists of an upper spur gear, and a lower integral pinion 27, which meshes with a rack 28 of a slidable bar or member 29. The relatively large spur gear also meshes with a pinion 30 of an operating lever or handle 31, which is adapted to be oscillated to move the slidable member inwardly and outwardly along the guide bar of the supporting frame.

While I have illustrated spur gearing for transmitting motion from the oscillatory operating lever or handle to the slidable bar or member, yet it will be apparent that any other preferred form of gears may be employed for this purpose.

The slidable bar or member, which is supported by the top guide bar of the triangular frame, is provided with a longitudinal groove 32 to receive the said guide bar, and the teeth of the rack 28 are formed at one side of the longitudinal groove. At the inner end of the groove, the slidable bar or member is equipped with spaced lugs or ears 33, having registering perforations for the reception of a rivet 34, or other suitable fastening device for retaining the bar or member 29 in slidable engagement with the guide bar of the supporting frame. The outer end of the bar or member 29 is equipped with a transverse lug 35, provided with an opening 36 of the same shape as the guide bar and receiving the outer portion of the same. The spaced lugs or ears 33 permit the slidable bar or member to be readily placed on the guide bar, and the pin or rivet 34, which pierces the lugs or ears, is located in the opening of the triangular frame and it retains the slidable bar or member thereon, but the said bar or member may be readily detached when the pin or rivet 34 is removed.

The pinion 30 of the operating handle or lever is mounted on a pivot 37, preferably consisting of a steel pin suitably fixed in the lower opening 20 of the supporting frame and provided in its upper portion with a threaded bore 38 receiving a screw 39, which secures a plate or washer 40 in engagement with the pinion 30. The pinion 30 is formed integral with the operating lever and is arranged on the upper portion of the said pin 37, and the lever or handle 31 is located in an inclined plane parallel to that of the double gear and higher than the same in order to enable the operating lever or handle to swing or rotate clear of the double gear. The screw and the washer detachably retain the pinion and the operating handle or lever on the pivot 37 and enable the lever and the pinion to be adjusted with relation to the double gear to position a nut receiving jaw or socket 41 of the slidable bar or member in proper position with relation to a fixed nut receiving jaw or socket 42 of the triangular frame to suit the size of the nuts to be cracked, and to enable the operating lever or handle to swing through the desired arc without crossing the nut engaging jaws or sockets and interfering with the rapid feeding of the nuts to the machine.

The nut receiving jaws or sockets 41 and 42 consist of concavities in the opposed faces of upwardly and outwardly projecting enlargements, formed integral with the slidable bar or member and with the supporting frame. The inclined nut receiving jaws or sockets 41 and 42 project from the inner side edge of the frame beyond the plane of the same, and the space at the upper and lower edges of the jaws or sockets is open or clear for introducing nuts between the jaws or sockets and for the discharge of the cracked nuts. The fixed jaw or socket is located at the upper end of the inclined angularly disposed brace 6, and the jaw or socket of the slidable bar or member is located opposite the lugs or ears 33. The concavities of the jaws or sockets are adapted to receive the ends of a pecan, or other nut to be cracked, but when the device is used for cracking black walnuts and other hard nuts, the jaws preferably operate on the sides or weaker portions of the shells of those nuts. To crack a nut the lever is oscillated to slide the bar or member horizontally to open the jaws far enough to receive the nut, and when the nut is in place, the handle or lever is swung in the opposite direction with a light quick pull, which instantly cracks the nut. After the nut is cracked, the operating lever or handle is reversed to again open the jaws, which instantly release the cracked nuts and arrange the parts in position to receive another nut. As the space below the inclined projecting nut engaging jaws is open, the cracked nut is instantly released and caused to fall into a suitable receptacle when the jaws are opened.

In Figs. 6 and 7 of the drawings is illustrated another form of the invention in which the operating handle or lever 43 is located at the rear end of the supporting frame 44, so that no matter how long or small the pecan or other nut to be cracked may be, the slidable bar or member 45 may be adjusted to suit the nut without the handle or lever swinging across the space between the co-acting nut cracking jaws or sockets. The supporting frame, which is approximately oblong, is set at an inclination and is provided with a depending flange 46, which is secured by a bolt 47 to an upwardly extending flange 48 of a clamp 49, constructed similar to that heretofore described. The inclination of the supporting frame 44, which is inclined similar to the triangular supporting frame for a similar purpose, consists of an upper guide bar 48ª and a lower bar 49ª, connected with the upper guide bar by integral central and end portions 50, 51 and 52. The oscillatory operating handle or lever is provided with an integral pinion 53, which meshes with a double gear 54, preferably consisting of a toothed segment and a relatively small pinion 55, which meshes with the rack 56 of the slidable bar or member 45. The slidable bar or member is constructed similar to that heretofore described with the exception that it is provided at its inner and outer ends with spaced perforated ears or lugs 57 and 58, connected by rivets 59 and 60, or other suitable fastening devices. The rivets 59 and 60 are located within the supporting frame, and they are adapted to be readily removed to permit the slidable bar or member to be detached. The pinion 53 is detachably mounted on a suitable pivot and is secured to the same by a washer 61 and a screw 62, while the double gear is mounted on a rivet 63, similar to the rivet 22, but any other form of pivot may be employed for mounting the pinion 53 and the double gear on the supporting frame. The detachable connection enables the operating handle or lever and its pinion to be detached for permitting an independent adjustment of the slidable bar or member 45, and after the latter has been properly positioned to ar- range its jaw or socket 64 in proper position with relation to the jaw or socket 65 of the frame, the pinion of the operating lever or handle is replaced on its pivot and reëngaged with the teeth of the segmental gear. The handle or lever 43 is arranged to swing clear of the double gear, as clearly illustrated in Fig. 7 of the drawings.

What is claimed is:—

1. A nut cracking machine including an inclined frame having an attaching flange at its lower portion and extending upwardly and inwardly therefrom and provided at the top with a fixed projecting jaw, a clamp provided with an upwardly extending flange fitted against and secured to the said attaching flange and having an inclined upper edge for supporting the frame in its inclined position, a slidable jaw mounted on the frame, said jaws projecting beyond the vertical plane of the frame to permit the cracked nuts to fall into a receptacle, and means for moving the sliding jaw toward and from the fixed jaw.

2. A nut cracking machine including an inclined frame provided at its lower portion with means for securing it to a table or other suitable support and having a guide bar extending along the top of the frame, a fixed nut engaging jaw located at one end of the guide bar and extending therefrom at an inclination beyond the vertical plane of the frame, a horizontally slidable member mounted on and movable along the guide bar and having an inclined jaw also projecting beyond the vertical plane of the frame, said member having a rack, and gearing mounted on the frame and meshing with the rack for moving the slidable member toward and from the fixed jaw.

3. A nut cracking machine including an inclined approximately triangular frame comprising a top longitudinal guide bar, an inclined supporting bar connected at its upper edge with the guide bar at a point intermediate of the ends thereof, and an inclined angularly disposed brace extending from the lower end of the inclined supporting bar to one end of the guide bar, a fixed nut engaging jaw located at the upper end of the brace and projecting beyond the vertical plane of the frame, a horizontally slidable member mounted on the guide bar and having a nut engaging jaw also projecting beyond the vertical plane of the frame and co-acting with the fixed jaw, and means mounted on the frame for actuating the slidable member.

4. A nut cracking machine including an inclined frame provided with means for mounting it on a table or other support and having a longitudinal guide bar located at the top of the frame so as to be spaced from the top of the table, a fixed nut engaging jaw located at one end of the guide bar, a slidable member having a longitudinal groove to receive the guide bar and provided at one side of the groove with teeth to form a rack and having spaced lugs or ears projecting beyond the guide bar, a nut engaging jaw carried by the slidable member and coacting with the fixed nut engaging jaw, said jaws projecting beyond the vertical plane of the supporting frame so as to discharge the cracked nuts from them, a fastening device piercing the lugs or ears and detachably retaining the slidable member on the guide bar, and gearing mounted on the frame and meshing with the rack for moving the slidable member toward and from the fixed jaw.

5. A nut cracking machine including an approximately triangular frame set at an inclination and provided at the bottom with means for mounting it on a table or other support and comprising a top guide bar, an inclined angularly disposed brace extending downwardly from one end of the guide bar, and a central inclined bar extending from the lower end of the brace to the guide bar, the latter projecting at one end from the frame, a slidable member provided with a groove to receive the guide bar and having teeth at one side of the groove forming a rack, fixed and movable nut engaging jaws mounted, respectively, on the frame and the slidable member and projecting beyond the vertical plane of the frame so as to discharge the cracked nuts, a lug carried by the outer end of the slidable member and having an opening receiving the guide bar, spaced ears projecting from the other end of the slidable member, a fastening device connecting the ears and located within the frame for retaining the slidable member thereon, and gearing mounted on the frame and meshing with the rack for actuating the slidable member.

6. A nut cracking machine including a frame provided with means for mounting it on a table or other support and having a longitudinal guide located at an elevation above the table or support, a fixed nut engaging jaw located at one end of the guide, a slidable member mounted on the guide and having a longitudinal rack and provided at its inner end with a nut engaging jaw, said jaws projecting beyond the vertical plane of the frame so as to discharge the cracked nuts automatically, a double gear having a pinion meshing with the rack, and an oscillatory lever provided with a pinion detachably mounted on the frame and meshing with the double gear and adapted when removed to permit an independent adjustment of the slidable member to enable the jaw thereof to be arranged at different points on the guide without affecting the position and stroke of the oscillatory lever.

7. A nut cracking machine including a supporting frame set at an inclination and provided at the bottom with means for securing it to a table or other support and extending upwardly and inwardly from the supporting means, a horizontally slidable member arranged at the upper edge of the frame and having a rack, fixed and movable nut engaging jaws projecting from the frame and the slidable member and extending beyond the plane of the frame so as to discharge the cracked nuts, a gear mounted on the supporting frame and arranged in an inclined plane and having a pinion meshing with the said rack, and an operating lever mounted on the supporting frame at the bottom thereof and arranged to swing in an inclined plane and provided with a pinion meshing with the gear.

In testimony, that I claim the foregoing as my own, I have hereto affixed my signature in the presence of two witnesses.

CHARLES WALTON McDONALD.

Witnesses:
 B. FRANK REEVES,
 R. M. ARMSTRONG.